US012217905B2

(12) United States Patent
Umeda et al.

(10) Patent No.: US 12,217,905 B2
(45) Date of Patent: *Feb. 4, 2025

(54) ELECTRONIC COMPONENT

(71) Applicant: TDK CORPORATION, Tokyo (JP)

(72) Inventors: Hidenobu Umeda, Tokyo (JP); Masaki Takahashi, Tokyo (JP); Kaori Sasaki, Tokyo (JP); Nami Enomoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 225 days.

This patent is subject to a terminal disclaimer.

(21) Appl. No.: 17/977,038

(22) Filed: Oct. 31, 2022

(65) Prior Publication Data

US 2023/0162910 A1 May 25, 2023

(30) Foreign Application Priority Data

Nov. 22, 2021 (JP) .................. 2021-189588

(51) Int. Cl.
*H01F 27/32* (2006.01)
*H01F 27/28* (2006.01)
*H01F 41/04* (2006.01)
*H01F 41/12* (2006.01)

(52) U.S. Cl.
CPC ....... *H01F 27/324* (2013.01); *H01F 27/2804* (2013.01); *H01F 41/043* (2013.01); *H01F 41/125* (2013.01); *H01F 2027/2809* (2013.01)

(58) Field of Classification Search
None
See application file for complete search history.

(56) References Cited

U.S. PATENT DOCUMENTS

| 6,699,605 | B2 * | 3/2004 | Umayahara | ............ C03C 3/085 501/61 |
| 2012/0015198 | A1 * | 1/2012 | Masukawa | ............ C04B 35/195 428/446 |

FOREIGN PATENT DOCUMENTS

| JP | H09-71472 A | 3/1997 |
| JP | H0971472 | * 3/1997 |
| JP | 2017-073536 A | 4/2017 |

* cited by examiner

*Primary Examiner* — Kim S. Horger
(74) *Attorney, Agent, or Firm* — Oliff PLC

(57) ABSTRACT

An electronic component includes a glass ceramic layer and a conductor layer. The glass ceramic layer includes feldspar crystal phases, non-crystalline glass phases, and $Al_2O_3$ phases. The area ratio of the feldspar crystal phases in the vicinity of the conductor layer is larger than the area ratio of the feldspar crystal phases away from the conductor layer.

7 Claims, 6 Drawing Sheets

ELECTRONIC COMPONENT

TECHNICAL FIELD

The present invention relates to an electronic component.

BACKGROUND

Patent Document 1 discloses an invention of a method of manufacturing a glass ceramic substrate. The glass ceramic includes fillers that partly or entirely contain flat grains.

Patent Document 2 discloses an invention of a multilayer inductor. Inside the multilayer structure is an embedded coil conductor. The multilayer inductor is suitable at a high-frequency range.

Patent Document 1: JP Patent Application Laid Open No. H09-71472

Patent Document 2: JP Patent Application Laid Open No. 2017-73536

SUMMARY

Ideal inductors have higher impedance at a higher frequency. Unfortunately, the impedance of actual inductors decreases in reciprocal proportion to their stray capacitance at a high frequency range. The stray capacitance of the inductors is in proportion to the permittivity of inductor materials. Thus, low permittivity is demanded of ceramics for radio frequency (RF) inductors used especially at the high frequency range. High strength is also demanded of the RF inductors, especially those used for vehicles.

It is an object of the present invention to provide an electronic component having low relative permittivity a and high strength.

An electronic component according to the present invention includes a glass ceramic layer and a conductor layer, wherein the glass ceramic layer includes feldspar crystal phases, non-crystalline glass phases, and $Al_2O_3$ phases, and the area ratio of the feldspar crystal phases in the vicinity of the conductor layer is larger than the area ratio of the feldspar crystal phases away from the conductor layer.

The conductor layer may mainly include Ag.

$Al_2O_3$ fillers of the $Al_2O_3$ phases may have an average aspect ratio of 15 or more and 75 or less.

The feldspar crystal phases may mainly include Sr.

The feldspar crystal phases may include Ag.

BRIEF DESCRIPTION OF THE DRAWING(S)

DETAILED DESCRIPTION

Hereinafter, an exemplary embodiment of the present invention will be explained in detail using the drawings.

Structure of Multilayer Coil Component

Figure 1:
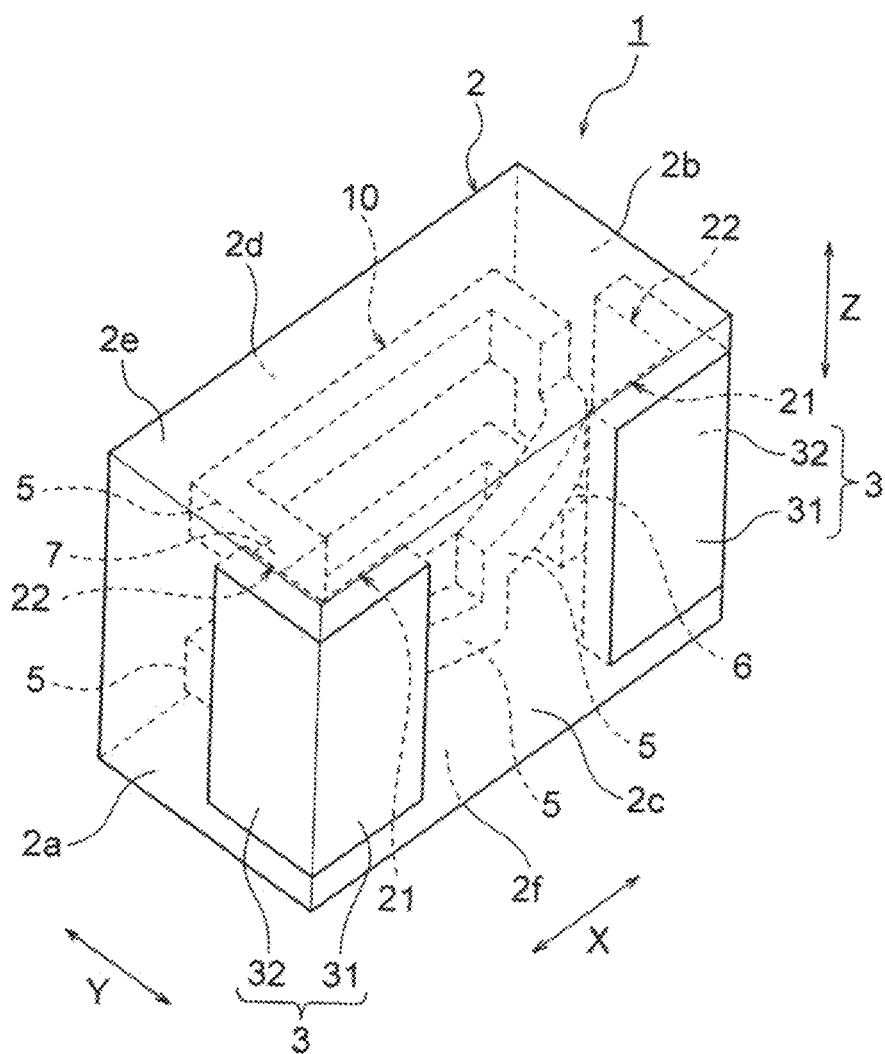
FIG. 1 is a perspective view of a multilayer coil component.
Figure 2:
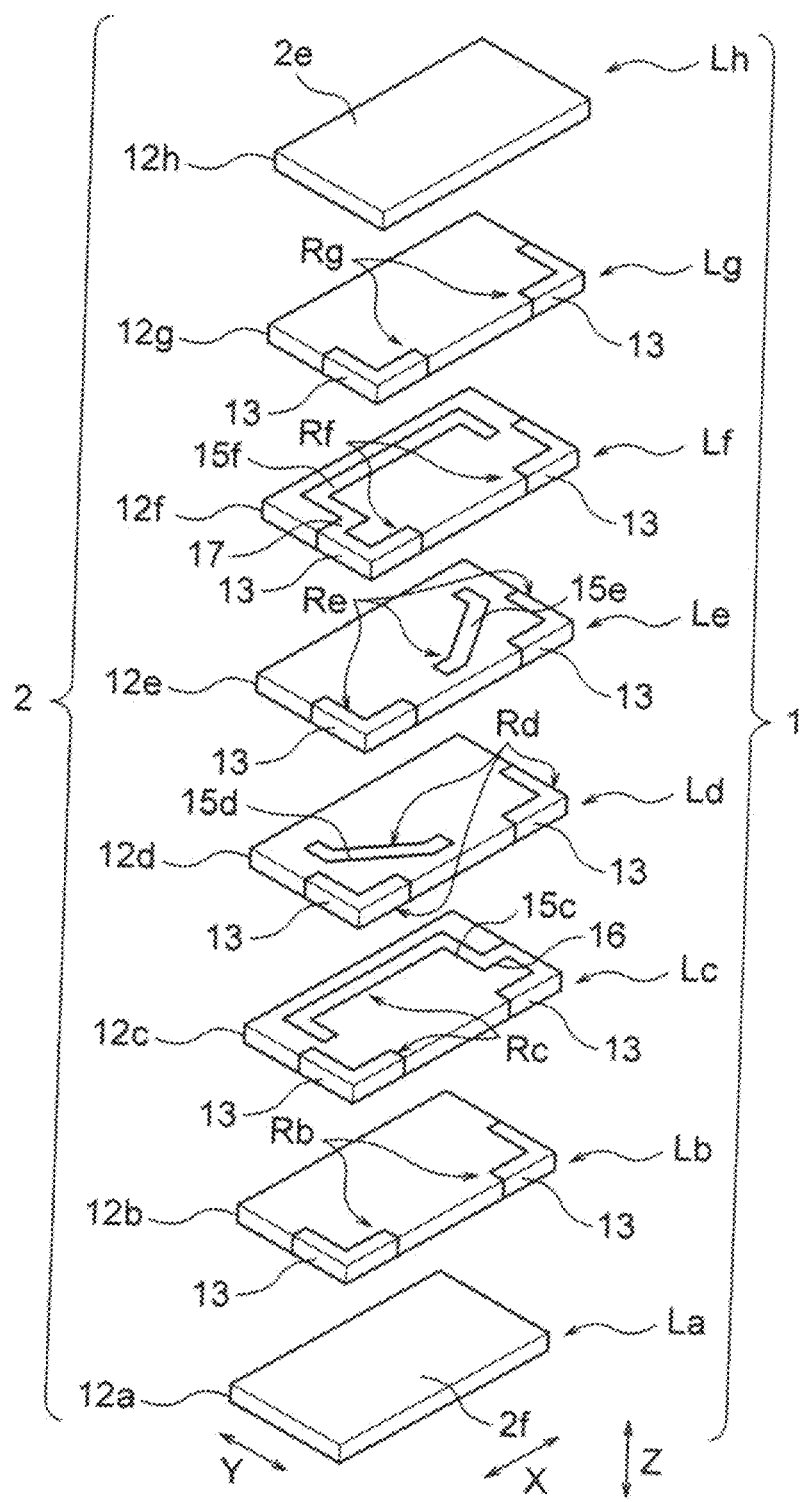
FIG. 2 is an exploded perspective view of the multilayer coil component shown in FIG. 1.

FIG. 1 is a perspective view of a multilayer coil component 1, which is an electronic component. FIG. 2 is an exploded perspective view of the multilayer coil component 1 shown in FIG. 1. As shown in FIGS. 1 and 2, the multilayer coil component 1 includes a glass ceramic element body 2, a coil 10 containing a pair of mounting conductors 3 and coil conductors 5, and connecting conductors 6 and 7.

The glass ceramic element body 2 has a rectangular parallelepiped shape. The definition of the rectangular parallelepiped shape includes the one having chamfered corners and chamfered ridges and the one having rounded corners and rounded ridges. The glass ceramic element body 2 has end surfaces 2a and 2b, and side surfaces 2c, 2d, 2e, and 2f, as outer surfaces. Hereinafter, the direction in which the end surfaces 2a and 2b face each other is defined as the X-axis direction, the direction in which the side surfaces 2c and 2d face each other is defined as the Y-axis direction, and the direction in which the side surfaces 2e and 2f face each other is defined as the Z-axis direction. The X-axis, the Y-axis, and the Z-axis are orthogonal to each other.

The end surfaces 2a and 2b extend in the Y-axis direction so as to connect the side surfaces 2c and 2d. The end surfaces 2a and 2b also extend in the Z-axis direction so as to connect the side surfaces 2e and 2f. The side surfaces 2c and 2d extend in the X-axis direction so as to connect the end surfaces 2a and 2b. The side surfaces 2c and 2d also extend in the Z-axis direction so as to connect the side surfaces 2e and 2f. The side surfaces 2e and 2f extend in the Y-axis direction so as to connect the side surfaces 2c and 2d. The side surfaces 2e and 2f also extend in the X-axis direction so as to connect the end surfaces 2a and 2b.

The side surface 2c is a mounting surface. For example, when the multilayer coil component 1 is mounted on an electronic component (e.g., a circuit substrate and a multilayer coil component) not shown in the drawings, the side surface 2c is the mounting surface facing the electronic component not shown in the drawings. The side surface 2c is adjacent to the end surfaces 2a and 2b and the side surfaces 2e and 2f.

The glass ceramic element body 2 may have any length in each direction.

The outer surfaces of the glass ceramic element body 2 are provided with a pair of depressions 21 and a pair of depressions 22. One depression 21 is provided on the end surface 2a side of the side surface 2c and is depressed toward the side surface 2d. The other depression 21 is provided on the end surface 2b side of the side surface 2c and is depressed toward the side surface 2d. One depression 22 is provided on the side surface 2c side of the end surface 2a and is depressed toward the end surface 2b. The other depression 22 is provided on the side surface 2c side of the end surface 2b and is depressed toward the end surface 2a.

One depression 21 and one depression 22 are continuously provided and have a shape corresponding to that of one mounting conductor 3. The other depression 21 and the other depression 22 are continuously provided and have a shape corresponding to that of the other mounting conductor 3. The depressions 21 and 22 have, for example, the same shape. The pair of depressions 21 is provided apart from each other in the X-axis direction.

The glass ceramic element body 2 includes a plurality of glass ceramic element body layers 12a to 12h, which are shown in FIG. 2, laminated in the Z-axis direction. Thus, the lamination direction of the glass ceramic element body layers 12a to 12h is the Z-axis direction. The lamination structure will be specifically described later. The glass ceramic element body layers 12a to 12h of the glass ceramic element body 2 are actually integrated, and it is difficult to visually recognize boundaries between the layers. The glass ceramic element body layers 12a to 12h include a glass ceramic, which will be described later.

The pair of mounting conductors 3 is disposed on the glass ceramic element body 2. Specifically, one mounting conductor 3 is disposed in one depression 21 and one depression 22, and the other mounting conductor 3 is disposed in the other depression 21 and the other depression 22. The mounting conductors 3 are apart from each other in the X-axis direction. Each mounting conductor 3 includes a plurality of mounting conductor layers 13 laminated in the Z-axis direction. Thus, the lamination direction of the mounting conductor layers 13 is the Z-axis direction. The mounting conductor layers 13 of each mounting conductor 3 are actually integrated, and it is difficult to visually recognize boundaries between the layers.

When viewed from the Z-axis direction, each mounting conductor 3 has an L shape. Each mounting conductor 3 includes a conductor portion 31 and a conductor portion 32, which are integrally provided. When viewed from the Z-axis direction, the conductor portion 31 extends in the X-axis direction, and the conductor portion 32 extends in the Y-axis direction. The conductor portion 31 is disposed in each depression 21, which is provided on the side surface 2c, so as to be apart from the side surfaces 2e and 2f. The conductor portion 32 is disposed in each depression 22, which is provided on the end surfaces 2a and 2b, so as to be apart from the side surfaces 2d, 2e, and 2f.

The conductor portions 31 and 32 each have a substantially rectangular plate shape. The mounting conductors 3 have an identical shape. Note that, the L shape may be any shape as long as it is a substantially L shape as a whole. For example, there may be depressions and projections on a surface of each mounting conductor 3 as long as it has a substantially L shape as a whole.

The conductor portion 31 includes two end portions facing each other in the X-axis direction. The conductor portion 32 includes two end portions facing each other in the Y-axis direction. One end portion of the conductor portion 31 and one end portion of the conductor portion 32 are connected and integrated. Corners of the conductor portions 31 and 32 disposed in the glass ceramic element body 2 at the other end portions of the conductor portions 31 and 32 may be rounded.

Each mounting conductor 3 may be provided with a plating layer including, for example, Ni, Sn, and Au. The plating layer may be formed by electrolytic plating or electroless plating.

The coil conductors 5 are connected to each other to form the coil 10 in the glass ceramic element body 2. The coil conductors 5 are disposed so as to be apart from the end surfaces 2a and 2b and the side surfaces 2c, 2d, 2e, and 2f.

The coil conductors 5 adjacent to each other in the Z-axis direction may be disposed so as to at least partially overlap when viewed from the Z-axis direction.

The coil conductors 5 include coil conductor layers 15c, 15d, 15e, and 15f laminated in the Z-axis direction.

The connecting conductor 6 extends in the X-axis direction and is connected to one of the coil conductors 5 and one conductor portion 32. The connecting conductor 7 extends in the X-axis direction and is connected to one of the coil conductors 5 and the other conductor portion 32.

The connecting conductor 6 includes a connecting conductor layer 16 shown in FIG. 2. The connecting conductor 6 may include one connecting conductor layer 16 or a plurality of connecting conductor layers 16 laminated in the Z-axis direction. The connecting conductor 7 includes a connecting conductor layer 17 shown in FIG. 2. The connecting conductor 7 may include one connecting conductor layer 17 or a plurality of connecting conductor layers 17 laminated in the Z-axis direction.

The conductor layers include conductive materials. The conductive materials may be of any type. The conductor layers may mainly include Ag. The conductive materials of the conductor layers may have the same composition or different compositions.

The multilayer coil component 1 may include a layer La, a layer Lb, a layer Lc, a layer Ld, a layer Le, a layer Lf, a layer Lg, and a layer Lh laminated in this order from the side surface 2f side to the side surface 2e side.

The layers La and Lh may be of any type and may include the glass ceramic element body layers 12a and 12h respectively.

The layers Lb and Lg include the glass ceramic element body layers 12b and 12g respectively, each combined with one pair of mounting conductor layers 13. The glass ceramic element body layers 12b and 12g have a shape corresponding to the pair of mounting conductor layers 13, and have recesses Rb and Rg respectively. The pair of mounting conductor layers 13 fits into each of the recesses Rb and Rg. The pair of mounting conductor layers 13 as a whole and the glass ceramic element body layer 12b or 12g have mutually complementary relationship.

The layer Lc includes the glass ceramic element body layer 12c, one pair of mounting conductor layers 13, the coil conductor layer 15c, and the connecting conductor layer 16 all combined. The glass ceramic element body layer 12c has a recess Rc. The recess Rc has a shape corresponding to the pair of mounting conductor layers 13, the coil conductor layer 15c, and the connecting conductor layer 16. The pair of mounting conductor layers 13, the coil conductor layer 15c, and the connecting conductor layer 16 fit into the recess Rc. The pair of mounting conductor layers 13, the coil conductor layer 15c, and the connecting conductor layer 16 as a whole, and the glass ceramic element body layer 12c have mutually complementary relationship.

The layer Ld includes the glass ceramic element body layer 12d, one pair of mounting conductor layers 13, and the coil conductor layer 15d all combined. The glass ceramic element body layer 12d has a recess Rd. The recess Rd has a shape corresponding to the pair of mounting conductor layers 13 and the coil conductor layer 15d. The pair of mounting conductor layers 13 and the coil conductor layer 15d fit into the recess Rd. The pair of mounting conductor layers 13 and the coil conductor layer 15d as a whole, and the glass ceramic element body layer 12d have mutually complementary relationship.

The layer Le includes the glass ceramic element body layer 12e, one pair of mounting conductor layers 13, and the coil conductor layer 15e all combined. The glass ceramic element body layer 12e has a recess Re. The recess Re has a shape corresponding to the pair of mounting conductor layers 13 and the coil conductor layer 15e. The pair of mounting conductor layers 13 and the coil conductor layer 15e fit into the recess Re. The pair of mounting conductor layers 13 and the coil conductor layer 15e as a whole, and the glass ceramic element body layer 12e have mutually complementary relationship.

The layer Lf includes the glass ceramic element body layer 12f, one pair of mounting conductor layers 13, the coil conductor layer 15f, and the connecting conductor layer 17 all combined. The glass ceramic element body layer 12f has a recess Rf. The recess Rf has a shape corresponding to the pair of mounting conductor layers 13, the coil conductor layer 15f, and the connecting conductor layer 17. The pair of mounting conductor layers 13, the coil conductor layer 15f, and the connecting conductor layer 17 fit into the recess Rf. The pair of mounting conductor layers 13, the coil conductor layer 15f, and the connecting conductor layer 17 as a whole, and the glass ceramic element body layer 12f have mutually complementary relationship.

The widths of the recesses Rb to Rg (may simply be referred to as the "recesses") are basically wider than the widths of the mounting conductor layers 13, the coil conductor layers 15c to 15f, and the connecting conductor layers 16 and 17 (may simply and collectively be referred to as the "conductor layers"). However, the widths of the recesses may intentionally be narrower than the widths of the conductor layers so that the glass ceramic element body layers 12b to 12g adhere to the conductor layers more firmly. The value calculated by subtracting the width of one of the conductor layers from the width of the corresponding recess may be, for example, −3 μm or more and 10 μm or less, or 0 μm or more and 10 μm or less.

The layers La, Lb, Lg, and/or Lh may include a plurality of layers La, a plurality of layers Lb, a plurality of layers Lg, and/or a plurality of layers Lh respectively. To increase the number of windings of the coil 10, appropriately-shaped layers may be added between the layers Lc and Lf as appropriate.

Area in Vicinity of Conductor Layers

Figure 3:
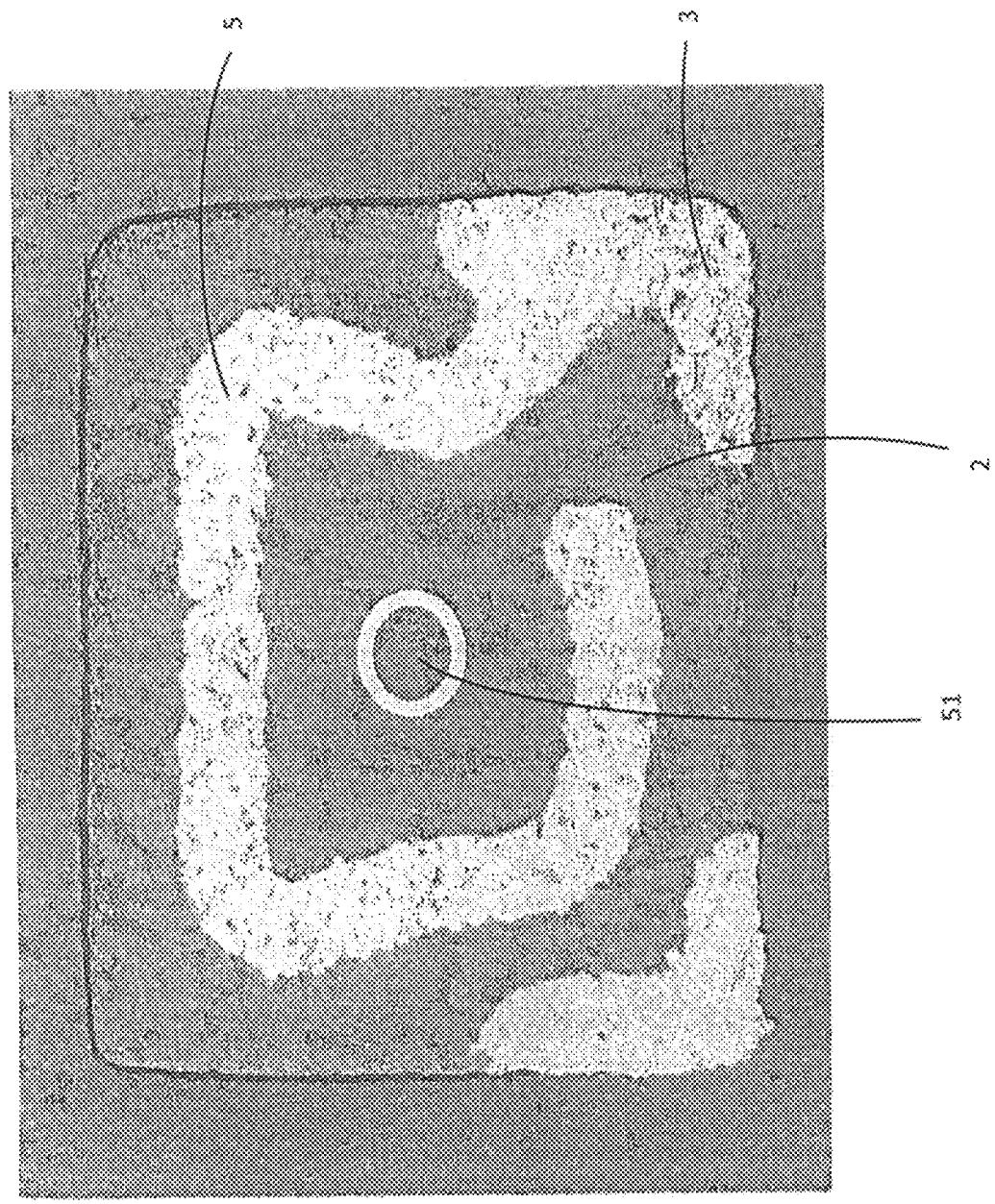
FIG. 3 is an image showing an exemplary area away from conductor layers.
Figure 4:
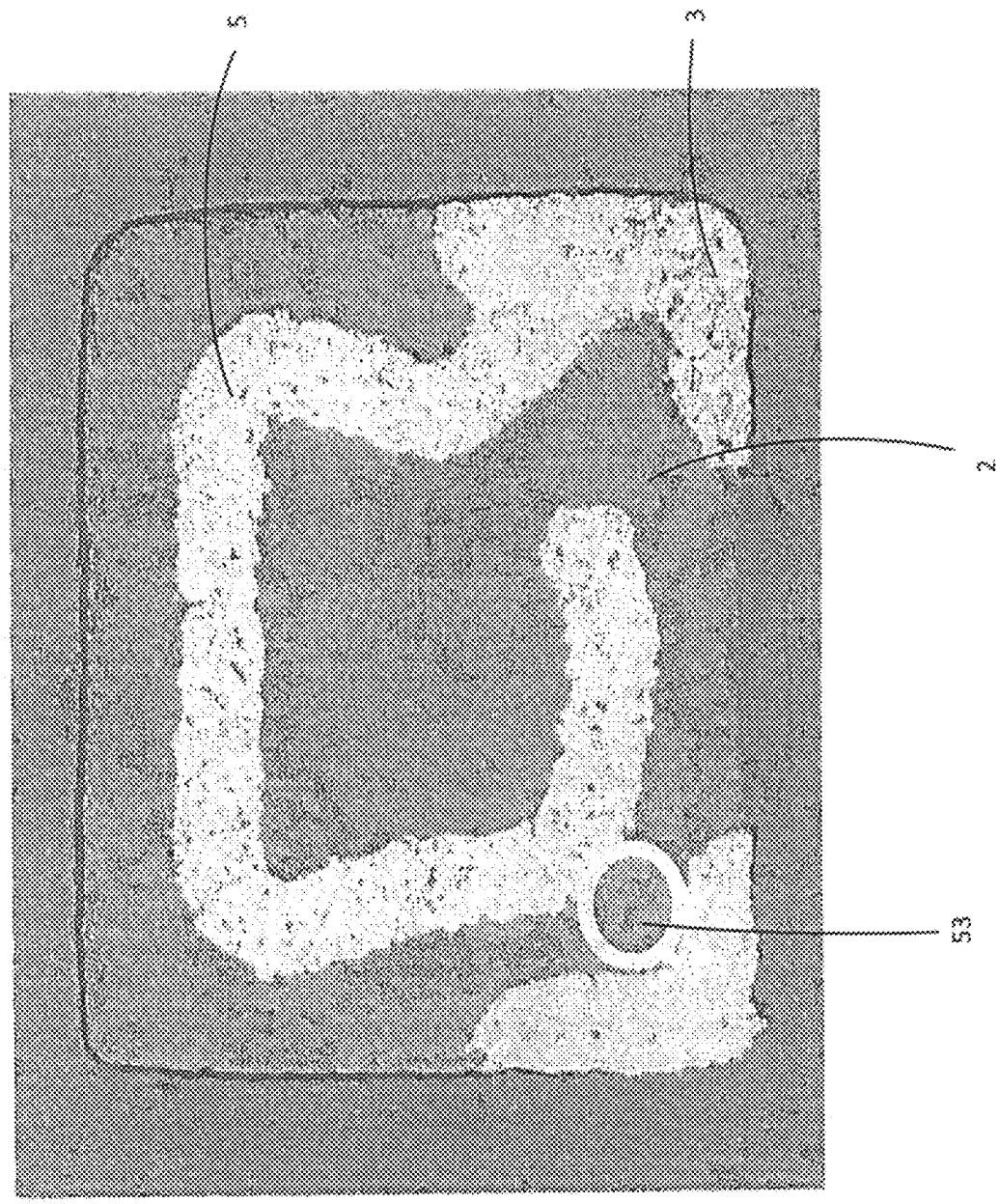
FIG. 4 is an image showing an exemplary area in the vicinity of the conductor layers.

FIGS. 3 and 4 are images of a cross section of the multilayer coil component 1 shown in FIG. 1 perpendicular to the Z-axis direction. The images are generated from observation with an optical microscope at a magnification of 500×.

FIG. 3 shows an area 51, which exemplifies an area away from the conductor layers. FIG. 4 shows a vicinity 53, which exemplifies an area in the vicinity of the conductor layers. The vicinity 53 is where the distance from the closest conductor layer is 10 μm or less. The area 51 is where the distance from the closest conductor layer exceeds 10 μm.

Material of Glass Ceramic Element Body 2 (Glass Ceramic Element Body Layers 12)

Figure 5:
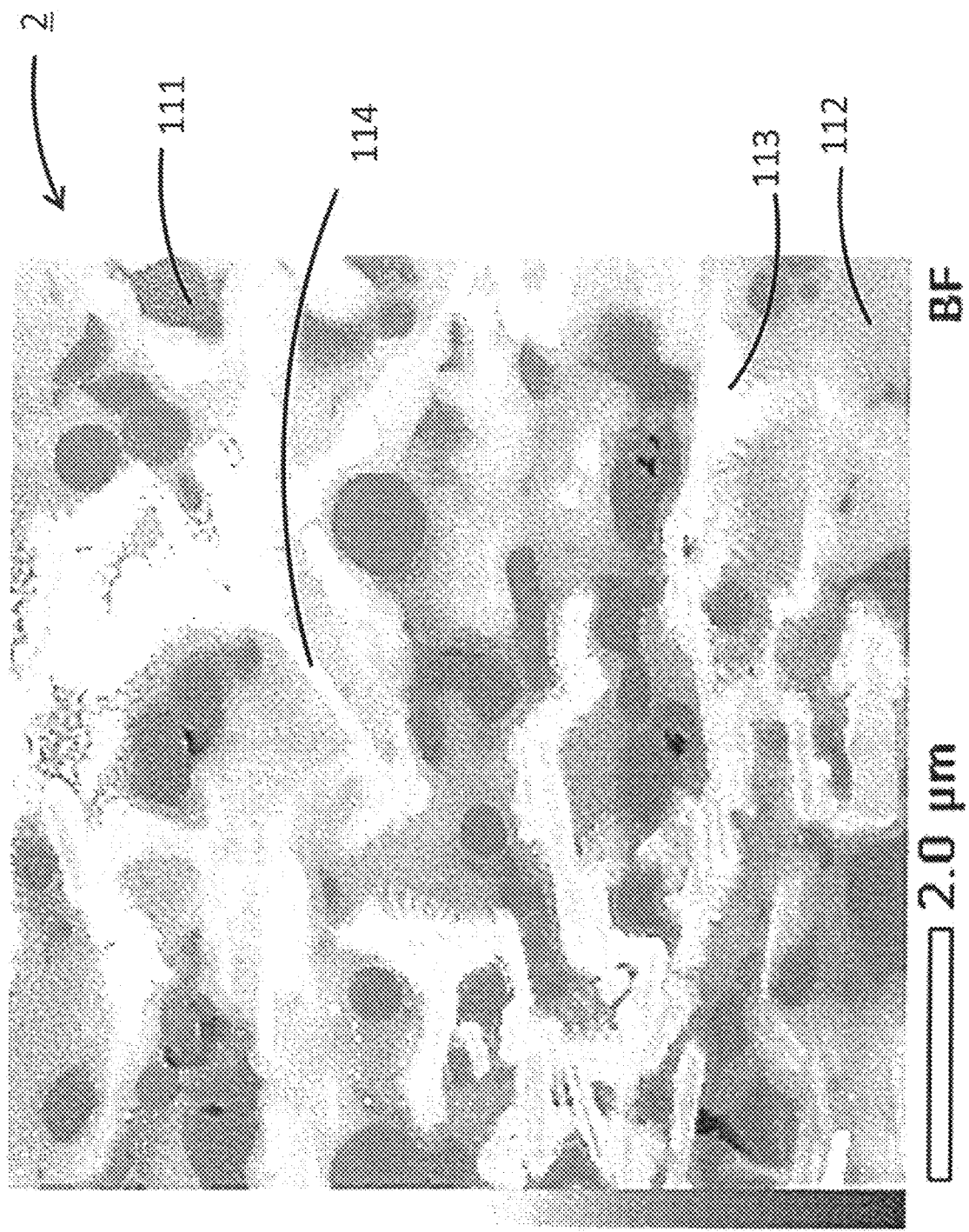
FIG. 5 is a STEM image of a cross section of a glass ceramic.
Figure 6:
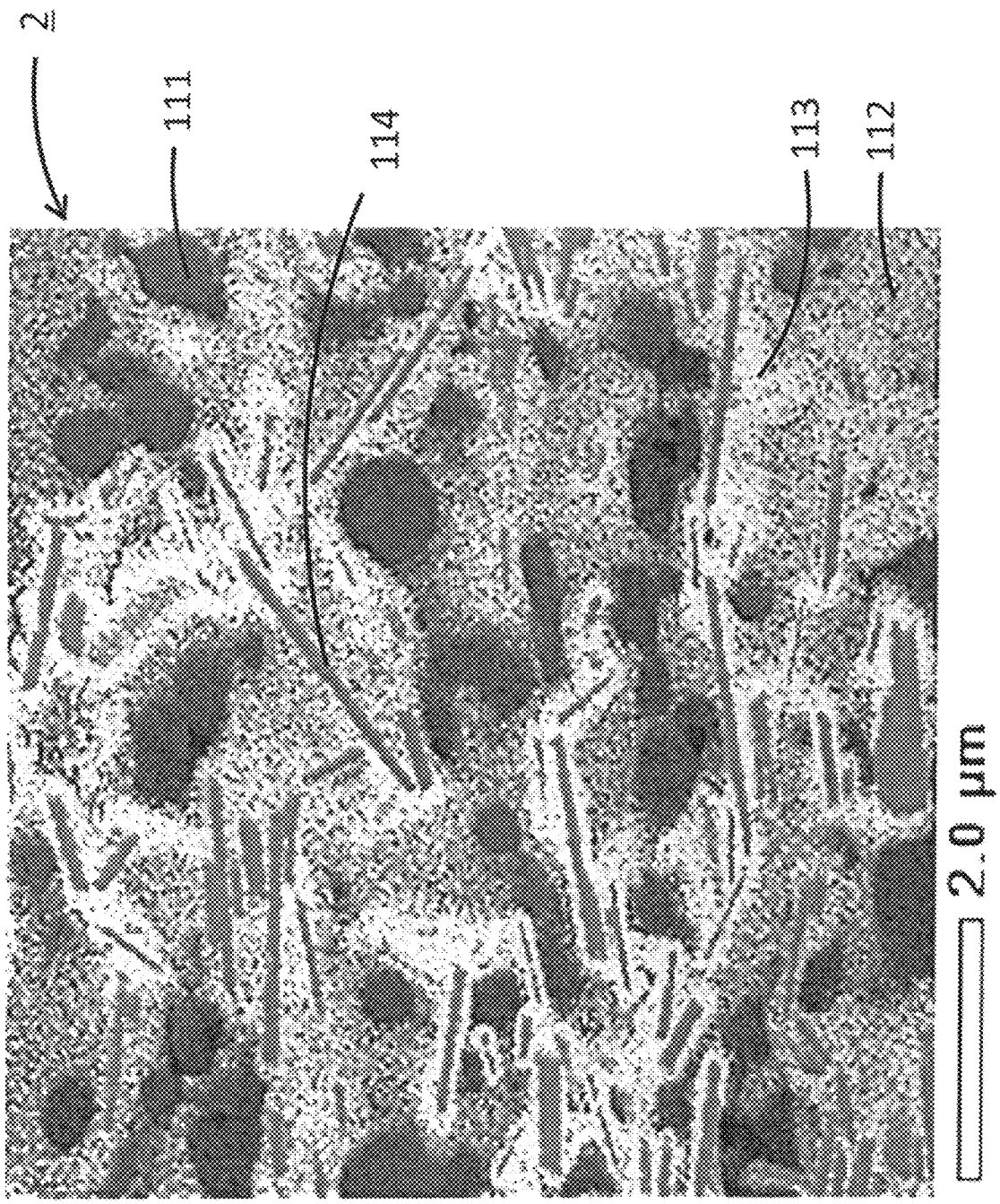
FIG. 6 is a phase separation analysis image of the cross section of the glass ceramic.

The glass ceramic element body 2 of the present embodiment includes at least feldspar crystal phases 113, non-crystalline glass phases 112, and $Al_2O_3$ phases 114 as shown in FIGS. 5 and 6, and may further include $SiO_2$ phases 111.

The feldspar crystal phases 113 mainly include feldspar crystals. The feldspar crystals include at least one metal element of Group 2, alumina, and silica, and are represented by a general formula $M(Si,Al)_4O_8$. "M" includes the at least one metal element of Group 2 (excluding Be). "M" may mainly include Sr. This means that, among all elements included in "M" of the feldspar crystals, Sr may account for the highest proportion in terms of mass. Note that, if the feldspar crystal phases 113 mainly include Sr, this also means that Sr accounts for the highest proportion in terms of mass among all elements included in "M" of the feldspar crystals in the feldspar crystal phases 113.

The feldspar crystal phases 113 may include metal oxides in addition to the feldspar crystals. Examples of the metal oxides include $Na_2O$, $K_2O$, $ZrO_2$, and $Ag_2O$.

The feldspar crystal phases 113 may thus include Ag. The proportion of the feldspar crystals in the feldspar crystal phases 113 is not limited and may be, for example, 80 mass % or more.

The area ratio of the feldspar crystal phases 113 in the vicinity of the conductor layers is larger than the area ratio of the feldspar crystal phases 113 away from the conductor layers. Specifically, the value calculated by dividing the area ratio of the feldspar crystal phases 113 in the vicinity of the conductor layers by the area ratio of the feldspar crystal phases 113 away from the conductor layers exceeds 1.0. The value may be 1.1 or more, and may be 1.3 or more. The value has no upper limit. For example, the upper limit is 3.0 or less. Having the area ratio of the feldspar crystal phases 113 in the vicinity of the conductor layers larger than the area ratio of the feldspar crystal phases 113 away from the conductor layers, the multilayer coil component 1 has large bending strength.

The amount of Ag in the feldspar crystal phases 113 in the vicinity of the conductor layers may be 4 mass % or more.

The non-crystalline glass phases 112 include glass that does not contain crystals. The glass in the non-crystalline glass phases 112 may have any composition. For example, the non-crystalline glass phases 112 may include oxides of "M", oxides of Si, oxides of Al, and oxides of B at a total of 70 mass % or more.

The $Al_2O_3$ phases 114 mainly include $Al_2O_3$ (alumina) crystals. The proportion of $Al_2O_3$ in the $Al_2O_3$ phases 114 is not limited and may be, for example, 97 mass % or more. The $SiO_2$ phases 111 mainly include $SiO_2$ (silicon dioxide). The proportion of $SiO_2$ in the $SiO_2$ phases 111 is not limited and may be, for example, 97 mass % or more.

At least one pair of $Al_2O_3$ phases 114 may be bonded via the feldspar crystal phases 113. When the at least one pair of $Al_2O_3$ phases 114 is bonded via the feldspar crystal phases 113, the strength is readily increased.

Having the above-mentioned structure of the glass ceramic element body 2, the relative permittivity ε is readily reduced and the strength is readily increased.

The microstructure of the glass ceramic element body 2 can be checked by observing its cross section with STEM-EDS or so and further performing phase separation analysis. FIG. 5 is an image (may simply be referred to as a "STEM image") generated in the observation of a cross section of the glass ceramic of the present embodiment with STEM. FIG. 6 is an image (may simply be referred to as a "phase separation analysis image") generated through RGB image phase analysis of the same field of view as that of FIG. 5 as phase separation analysis. The field of view may have any size and may be observed at any magnification as long as the microstructure of the glass ceramic is observed without fail. For example, the size of the field of view is 200 μm² or more, and the magnification of the images is 5000× or more. The field of view may include a plurality of fields of view. The total size of the plurality of fields of view is, for example, 200 μm² or more.

As shown in FIGS. 5 and 6, the glass ceramic element body 2 includes the feldspar crystal phases 113, the non-crystalline glass phases 112, the $Al_2O_3$ phases 114, and the $SiO_2$ phases 111. In FIG. 5 (STEM image), boundaries between the feldspar crystal phases 113 and the $Al_2O_3$ phases 114 are not clear. Using both FIG. 5 (STEM image) and FIG. 6 (phase separation analysis image) clarifies the boundaries between the feldspar crystal phases 113 and the $Al_2O_3$ phases 114. Surrounding the $Al_2O_3$ phases 114 are the feldspar crystal phases 113 and/or the non-crystalline glass phases 112. At least one pair of $Al_2O_3$ phases 114 may be bonded via the feldspar crystal phases 113.

For identifying the phases, they may be irradiated with an electron beam to measure electron diffraction patterns. When the electron diffraction pattern of the non-crystalline glass phases 112 is measured, only halo patterns attributable to amorphousness are generated, and no spots attributable to crystals are generated. In contrast, when the electron diffraction patterns of the feldspar crystal phases 113 and the $Al_2O_3$ phases 114 are measured, a number of spots attributable to crystals are generated. When the electron diffraction pattern of the $SiO_2$ phases 111 is measured, halo patterns attributable to amorphousness and/or spots attributable to crystals are generated.

In the glass ceramic element body 2, phases other than the four types of phases, namely the feldspar crystal phases 113, the non-crystalline glass phases 112, the $Al_2O_3$ phases 114, and the $SiO_2$ phases 111, may be so small that the phases other than the four can be ignored. For example, the phases other than the four may occupy an area ratio of 5% or less (including 0%).

The glass ceramic element body 2 may include pores. However, the glass ceramic element body 2 is so dense that it includes few pores. Including few pores is preferable with regard to improvement of the strength. For example, the pores may occupy an area ratio of 5% or less (including 0%).

$Al_2O_3$ fillers of the $Al_2O_3$ phases 114 may have an average aspect ratio of 15 or more and 75 or less. When the average aspect ratio of the $Al_2O_3$ fillers is within the above-mentioned range, the glass ceramic element body 2 readily has higher strength than when the average aspect ratio of the $Al_2O_3$ fillers falls below the range. When the average aspect ratio of the $Al_2O_3$ fillers exceeds 75, the glass ceramic element body 2 readily has lower sinterability, more pores, and lower strength.

The average aspect ratio of the $Al_2O_3$ fillers can be calculated by measuring the aspect ratio of each $Al_2O_3$ phase 114 in the phase separation analysis image and working out the average.

$SiO_2$ fillers of the $SiO_2$ phases 111 may have an average grain size of 0.10 μm or more and 3.0 μm or less. The smaller the average grain size of the $SiO_2$ fillers, the more likely it is to reduce the sinterability, and the less likely it is for the $Al_2O_3$ phases 114 to be bonded via the feldspar crystal phases 113. The larger the average grain size of the $SiO_2$ fillers, the more likely it is for the glass ceramic element body layers 12 to have large surface roughness, especially when the glass ceramic element body layers 12 are prepared.

The average grain size of the $SiO_2$ fillers can be calculated by measuring the equivalent circular diameter of each $SiO_2$ phase 111 in the phase separation analysis image and working out the average. The equivalent circular diameter of the $SiO_2$ phase 111 means the diameter of a circle having the same area as the projected area of the $SiO_2$ phase 111.

The non-crystalline glass phases 112 mainly include a glass component, and the feldspar crystal phases 113 mainly include a glass component. In the glass ceramic element body 2 of the present embodiment, the $SiO_2$ fillers and the $Al_2O_3$ fillers are dispersed in each glass component.

The value calculated by dividing the area ratio of the feldspar crystal phases 113 by the area ratio of the non-crystalline glass phases 112 may be 0.10 or more and less than 1.00. The smaller the value, the less likely it is for the $Al_2O_3$ phases 114 to be bonded via the feldspar crystal phases 113. The larger the value, the more likely it is to increase the strength and unfortunately the relative permittivity ε.

The area ratio of the feldspar crystal phases 113 is not limited. The area ratio of the feldspar crystal phases 113 away from the conductor layers may be 6.5% or more and 20.5% or less, and may be 16.0% or more and 20.5% or less. The area ratio of the feldspar crystal phases 113 in the vicinity of the conductor layers may be 16.3% or more and 30.5% or less, and may be 20.5% or more and 30.5% or less.

The area ratio of the $Al_2O_3$ phases 114 may be 7.0% or more and 20.0% or less. The smaller the area ratio of the $Al_2O_3$ phases 114, the less likely it is for the $Al_2O_3$ phases 114 to be bonded via the feldspar crystal phases 113.

The area ratio of the $SiO_2$ phases 111 may be 10.0% or more and 30.0% or less. The smaller the area ratio of the $SiO_2$ phases 111, the more likely it is to increase the relative permittivity. The larger the area ratio of the $SiO_2$ phases 111, the more likely it is to reduce the sinterability, and the less likely it is for the $Al_2O_3$ phases 114 to be bonded via the feldspar crystal phases 113.

The area ratio of each type of phase can be calculated by performing image analysis of the phase separation analysis image.

Method of Manufacturing Multilayer Coil Component 1

First, a glass raw material, a $SiO_2$ filler raw material, and an $Al_2O_3$ filler raw material constituting the glass ceramic element body layers 12 are mixed. The $SiO_2$ filler raw material is not essential, but is included in the following explanation.

Crystallized glass and non-crystalline glass are prepared as the glass raw material and are mixed.

The crystallized glass includes a component that grows into the feldspar crystals during heating (described later). Examples of the component that grows into the feldspar crystals during heating (described later) include oxides of "M", oxides of Si, and oxides of Al. The crystallized glass may include other components, such as various oxides (e.g., oxides of B), as appropriate.

The non-crystalline glass may be of any type. For example, the non-crystalline glass may be glass that includes oxides appropriately selected from various oxides (e.g., oxides of Si, oxides of B, and oxides of K) and does not include crystals. The glass component of the crystallized glass may mostly be included in the feldspar crystal phases 113 in the end, and the non-crystalline glass may mostly be included in the non-crystalline glass phases 112 in the end.

The non-crystalline glass may combine with the crystallized glass during heating (described later). Oxides not included in the non-crystalline glass may be included in the non-crystalline glass phases 112.

When the glass raw material includes only the non-crystalline glass, the feldspar crystal phases 113 are difficult to be generated. When the glass raw material includes only the crystallized glass, the non-crystalline glass phases 112 readily account for a small proportion. Controlling the proportion of each raw material allows the area ratio of each type of phase to be controlled. In particular, controlling the ratio of the crystallized glass to the non-crystalline glass allows the value calculated by dividing the area ratio of the feldspar crystal phases 113 by the area ratio of the non-crystalline glass phases 112 to be controlled.

The glass raw material may have any particle size. For example, the glass raw material may have a D90 of 1 to 5 μm measured with a laser diffraction type particle size distribution meter. The amount of alkali metals in the glass raw material is preferably small. Specifically, the amount of alkali metals with respect to 100 mass % of the total of the glass raw material, the $SiO_2$ filler raw material, and the $Al_2O_3$ filler raw material is preferably less than 1 mass %. When the amount of alkali metals is large, feldspar crystals are difficult to be generated in the vicinity of the conductor layers.

The $Al_2O_3$ filler raw material is preferably α-alumina having a relatively high melting point so that the glass ceramic after heating includes the $Al_2O_3$ phases 114. The $Al_2O_3$ filler raw material may have a particulate shape or a plate shape. Controlling the shape of the $Al_2O_3$ filler raw material allows the average aspect ratio of the $Al_2O_3$ phases 114 to be controlled. For example, the $Al_2O_3$ fillers have a low aspect ratio when the $Al_2O_3$ filler raw material has a particulate shape, and have a high aspect ratio when the $Al_2O_3$ filler raw material has a plate shape. Although part of $Al_2O_3$ in the $Al_2O_3$ filler raw material may react with "M" and Si and be incorporated into the feldspar crystal phases 113, a large part of $Al_2O_3$ in the $Al_2O_3$ filler raw material grows into the $Al_2O_3$ phases 114. The higher the aspect ratio of the $Al_2O_3$ fillers, the more likely it is to increase the surface area of the $Al_2O_3$ phases 114 (their perimeters in the STEM image) and the area ratio of the feldspar crystal phases 113 in contact with the $Al_2O_3$ phases 114.

As the $SiO_2$ filler raw material, quartz glass (amorphous silica) can be used. Controlling the particle size of the $SiO_2$ filler raw material allows the average grain size of the $SiO_2$ phases 111 to be controlled. Although part of $SiO_2$ in the $SiO_2$ filler raw material may be incorporated into the non-crystalline glass phases 112 or the feldspar crystal phases 113 by heating, a large part of $SiO_2$ in the $SiO_2$ filler raw material is included in the $SiO_2$ phases 111.

Next, the mixed raw materials are mixed in wet manner for 24 hours with a solvent normally used in the technical field to give a raw material slurry. The solvent may be alcohol, which is normally used in the technical field. Any device may be used for wet mixing. For example, a ball mill may be used.

Next, the raw material slurry is dried until the solvent is removed to give a glass ceramic material. Any device may be used for drying. For example, a spray dryer may be used.

Next, the glass ceramic material may be subjected to a silane coupling treatment as necessary. Specifically, a silane coupling agent may be added to the glass ceramic material and mixed together with a mixer. The silane coupling agent may be of any type. The silane coupling treatment improves the coupling between the glass ceramic material and a binder (described later).

Next, a binder and a photosensitive material are added to the glass ceramic material to give paint. The binder may be of any type. For example, an acrylic resin-based binder is used. The photosensitive material may be of a negative type or a positive type, and can be a known one. Any device may be used to produce the paint. For example, a ball mill is used.

Next, the paint is applied onto PET films to form element-body-forming layers. Any device may be used to apply the paint onto the PET films. For example, a coater is used. Then, the element-body-forming layers are exposed to light and developed by a photolithography method using, for example, a Cr mask, to form element-body patterns including recesses having shapes corresponding to conductor-forming layers (described later). The element-body patterns are to be the glass ceramic element body layers 12b to 12g after heating. That is, the element-body patterns including the recesses to be the recesses Rb to Rg are formed on the PET films. Note that, the photolithography method is only required to be a method for forming desired patterns by exposing target photosensitive layers to light and developing the layers, and has no further limitations. For example, the type of the mask is not limited.

A conductor paste including the constituent material of the conductor layers and a photosensitive material is prepared and applied onto PET films to form the conductor-forming layers. Any device may be used to apply the conductor paste onto the PET films. For example, a coater is used. The photosensitive material in the conductor paste may be of a negative type or a positive type, and can be a known one. Then, the conductor-forming layers are exposed to light and developed with the photolithography method using, for example, a Cr mask to form conductor patterns on the PET films. The conductor patterns are to be the conductor layers after heating.

Then, one element-body forming layer that does not include recesses is transferred from the PET film onto a supporting body. This forms a layer to be the layer La after heating.

Then, the conductor patterns and the element-body patterns are repeatedly transferred onto the supporting body so as to be laminated in the Z-axis direction. Specifically, the next conductor pattern is first transferred from the PET film onto the element-body-forming layer. Then, the next element-body pattern is transferred from the PET film onto the element-body-forming layer. The conductor pattern combines with the recess of the element-body pattern. The element-body pattern and the conductor pattern form a layer on the element-body forming layer. This transferring step (transferring the next conductor pattern and the next element-body pattern) is repeated. Thus, layers to be the layers Lb to Lg after heating are laminated.

Then, one element-body forming layer that does not include recesses is transferred from the PET film onto the supporting body. This forms a layer to be the layer Lh after heating and completes the manufacture of the glass ceramic element body 2.

Next, the glass ceramic element body 2 is densified by pressing. Any device may be used for pressing. For example, a warm isostatic press (WIP) machine is used.

To manufacture a plurality of glass ceramic element bodies 2 at the same time, dicing may be performed next. Any device may be used for dicing. For example, a dicer is used.

Next, the glass ceramic element body 2 is heated for firing. At this time, when the conductor layers mainly include Ag, heating at a lower temperature (low-temperature heating) is preferably performed before heating at a temperature at which the glass ceramic element body layers 12 crystallize (high-temperature heating) is performed. Low-temperature heating and high-temperature heating may be performed under any conditions. For example, in low-temperature heating, the heating temperature may be 750 to 850° C., and the heating time may be 10 to 120 minutes. In high-temperature heating, the heating temperature may be 850 to 950° C., and the heating time may be 10 to 120 minutes.

Low-temperature heating is performed at a temperature at which the glass included in the glass ceramic element body layers 12 softens but does not readily crystallize. Softening of the glass allows the substances in the glass ceramic element body layers 12 to move. By low-temperature heating, Ag diffuses from the conductor layers into the glass ceramic element body layers 12 (especially in the vicinity of the conductor layers) before the glass ceramic element body layers 12 are crystallized, and the glass ceramic element body layers 12 densify. This increases the amount of Ag in the vicinity of the conductor layers, the area ratio of the feldspar crystal phases 113 in the vicinity of the conductor layers, and the proportion that Ag occupies in the feldspar crystal phases 113. Consequently, the bending strength readily increases.

When only high-temperature heating is performed, heating increases the amount of Ag in the vicinity of the conductor layers, the area ratio of the feldspar crystal phases 113 in the vicinity of the conductor layers, and the proportion that Ag occupies in the feldspar crystal phases 113.

Also, high-temperature heating more readily increases the area ratio of the feldspar crystal phases 113 than low-temperature heating does. This is because high-temperature heating more readily accelerates crystallization of the feldspar crystals. However, high-temperature heating makes the glass ceramic element body layers 12 crystallize and proves an obstacle in the increase of the amount of Ag in the vicinity of the conductor layers. As a result, it is more difficult to increase the amount of Ag in the vicinity of the conductor layers, the area ratio of the feldspar crystal phases 113 in the vicinity of the conductor layers, and the proportion that Ag occupies in the feldspar crystal phases 113 than when low-temperature heating is additionally performed. Consequently, the bending strength is difficult to be increased.

Next, terminal electrodes may be formed as necessary. The terminal electrodes may be formed from any material using any method as long as the material and the method are normal ones in the technical field. For example, the terminal electrodes may include Ag and may be baked at 600 to 700° C. in a baking furnace.

Next, a plating layer may be formed on the terminal electrodes or the mounting conductors 3 by electrolytic plating or electroless plating as necessary.

The present invention is not limited to the above-described embodiment, and can variously be modified within the scope of the present invention. For example, the coil conductors may be connected using a through-hole conductor. Instead of the photolithography method, a screen printing method may be used to form the conductor patterns. The electronic component may be a component other than a multilayer electronic component. That is, the electronic component may have only one glass ceramic layer and/or one conductor layer.

The electronic component according to the present embodiment may be used for any purpose. For example, the electronic component is suitable for radio frequency (RF) inductors, particularly those for vehicles requiring high strength.

EXAMPLES

Hereinafter, the present invention will be explained based on more detailed examples, but the present invention is not limited thereto.

Experiment 1

A glass raw material, a $SiO_2$ filler raw material, and an $Al_2O_3$ filler raw material were prepared. As the glass raw material, crystallized glass and non-crystalline glass were prepared. Then, 45.5 parts by mass of the crystallized glass, 30.0 parts by mass of the non-crystalline glass, 24.5 parts by mass of the $Al_2O_3$ filler raw material, and 10.0 parts by mass of the $SiO_2$ filler raw material were mixed at this ratio.

The crystallized glass had a Si—Sr—Al-based composition (the amount of $SiO_2$: 37 to 45 mass %, the amount of SrO: 35 to 40 mass %, the amount of $Al_2O_3$: 5 to 15 mass %, and the amount of $B_2O_3$: 1 to 5 mass %).

The non-crystalline glass had a Si—B—K-based composition (the amount of $SiO_2$: 75 to 85 mass %, the amount of $B_2O_3$: 15 to 20 mass %, and the amount of $K_2O$: 1 to 5 mass %).

In Comparative Examples 2 and 3, $Na_2O$ and $K_2O$ were further added to the glass raw material so that the amount of alkali metals accounted for 1 mass % or more with respect to 100 mass % of the total of the glass raw material, the $SiO_2$ filler raw material, and the $Al_2O_3$ filler raw material.

The $SiO_2$ filler raw material had an average particle size so that $SiO_2$ fillers observed in the end had an average grain size of 0.5 μm. The $Al_2O_3$ filler raw material had an average particle size of 1 to 3 μm. The $Al_2O_3$ filler raw material had an aspect ratio so that $Al_2O_3$ fillers observed in the end had an average aspect ratio shown in Table 1.

Next, the mixed raw materials were mixed in wet manner with a solvent (99% methanol-denatured ethanol) using a ball mill (media: zirconia balls) for 24 hours to give a raw material slurry. This raw material slurry was dried with a drying machine until the solvent was removed to give a glass ceramic material.

Next, the glass ceramic material was subjected to a silane coupling treatment. Specifically, 1 part by mass of KBM-103 as a silane coupling agent was added to 100 parts by mass of the glass ceramic material, and they were mixed with a mixer.

Next, a binder and a photosensitive material were added to the glass ceramic material to give paint. Specifically, 40 parts by mass of acrylic resin as the binder and the photosensitive material was added to the 100 parts by mass of the glass ceramic material to give the paint.

A conductor paste including the constituent material of conductor layers and a photosensitive material was also prepared. Specifically, 2 parts by mass of varnish, 10 parts by mass of dipropylene glycol monomethyl ether as an organic solvent, and 10 parts by mass of acrylic resin as the photosensitive material were added to 100 parts by mass of a Ag powder and were mixed.

Next, element-body patterns were formed with the paint, and conductor patterns were formed with the conductor paste. The element-body patterns and the conductor patterns were shaped so that multilayer coil components to be manufactured in the end had a shape shown in FIG. 1.

The paint was applied onto PET films to form element-body-forming layers. A coater was used as a device for applying the paint onto the PET films. Then, the element-body-forming layers were exposed to light and developed by a photolithography method using a Cr mask to form the element-body patterns.

On the other hand, the conductor paste was applied onto PET films to form conductor-forming layers. A coater was used as a device for applying the conductor paste onto the PET films. Then, the conductor-forming layers were exposed to light and developed by the photolithography method using a Cr mask to form the conductor patterns.

The element-body-forming layers, the element-body patterns, and the conductor patterns were then laminated so that the multilayer coil components to be manufactured in the end had the above-mentioned shape.

Next, the glass ceramic element body 2 was densified by pressing. A WIP machine was used for pressing.

Next, the glass ceramic element body 2 was diced with a dicer into glass ceramic element bodies 2.

Next, the glass ceramic element bodies 2 were heated for firing. In the examples in which low-temperature heating and the high-temperature heating were performed, the glass ceramic element bodies 2 were heated at 800° C. for the time shown in Table 1 and then heated at 900° C. for the time shown in Table 1. In the examples in which only high-temperature heating was performed, the glass ceramic element bodies 2 were heated at 900° C. for the time shown in Table 1.

Next, a plating layer including Ni and Sn was formed on the mounting conductors 3 by electrolytic plating.

Next, the microstructure and various characteristics of the glass ceramic sintered body were evaluated under the following conditions. Table 1 shows the results.

Microstructure

A coil center portion (an area away from the conductor layer) and an area in the vicinity of the conductor layer in the cross section of the glass ceramic sintered body were observed with STEM (JEM-2200FS) to check STEM images. Further, phase separation analysis was performed through RGB image phase analysis. The fields of view had a size of 7.5 μm×7.5 μm and a magnification of 7500×. The fields of view were determined at five different locations for each of the present examples. At these fields of view, the STEM images were taken, and phase separation analysis was performed. The five STEM images and the five phase separation analysis images were used to calculate the average aspect ratio of the $Al_2O_3$ fillers and the area ratio of feldspar crystal phases. Then, a value was calculated by dividing the area ratio of the feldspar crystal phases in the vicinity of the conductor layers by the area ratio of the feldspar crystal phases away from the conductor layers. Further, the amount of Ag in the feldspar crystal phases in the vicinity of the conductor layers was calculated in mass percent. Table 1 shows the results.

In the present examples, the non-crystalline glass did not include oxides of Sr or oxides of Al. However, it was confirmed that the non-crystalline glass phases included in the glass ceramic sintered body manufactured in the end included SrO and $Al_2O_3$.

Relative Permittivity ε

The relative permittivity (no unit) was measured with a network analyzer (8510C manufactured by HEWLETT PACKARD) using a resonance method (JIS R 1627). Among the present examples, those having a relative permittivity ε of 6.00 or less were deemed good, and those having a relative permittivity ε of 5.80 or less were deemed better.

Bending Strength Test

A bending strength test was performed as follows. The multilayer coil components (samples) of the Examples and the Comparative Examples were each soldered on a substrate (glass epoxy substrate having a size of 100 mm×40 mm and a thickness of 1.6 mm) at its center. Then, from the surface (the backside of the substrate) opposite the surface on which the sample was soldered, a load was applied so that the substrate was bent at a predetermined bending amount for 5 seconds. The appearance of and the cracks inside the sample after the load application were evaluated.

For each Example and each Comparative Example, first, the bending strength test was performed with ten samples at a bending amount of 1.2 mm. Next, the bending strength test was performed with another ten samples at a bending amount of 1.6 mm. Lastly, the bending strength test was performed with another ten samples at a bending amount of 2.0 mm. That is, for each Example and each Comparative Example, the bending strength test was performed with a total of thirty samples.

At a bending amount of 1.2 mm, among the present examples, those having no occurrence of cracks, namely those having zero sample with cracks in the ten samples, were deemed good.

At a bending amount of 1.6 mm, those having a crack rate of 10% or less, namely those having one sample with cracks at most in the ten samples, were deemed good; and those having no occurrence of cracks, namely those having zero sample with cracks in the ten samples, were deemed better.

At a bending amount of 2.0 mm, those having a crack rate of 50% or less, namely those having five samples with cracks at most in the ten samples, were deemed good; those having a crack rate of 20% or less, namely those having two samples with cracks at most in the ten samples, were deemed better; and those having no occurrence of cracks, namely those having zero sample with cracks in the ten samples, were deemed best.

Experiment 2

Experiment 2 was conducted as in Experiment 1 except that the metal element mainly included in the glass raw material of Example 1 of Experiment 1 was changed from Sr to Mg, Ca, or Ba. Table 1 shows the results.

TABLE 1

| | Alkali metal amount in materials | Average aspect ratio of $Al_2O_3$ fillers | Metal element in glass raw material | Heating time at 800° C. (min) | Heating time at 900° C. (min) | Area ratio of feldspar crystal phases (%) | | S2/S1 | Ag amount in feldspar crystal phases in the vicinity of conductor layers (%) | Relative permittivity ε | Crack rate | | |
|---|---|---|---|---|---|---|---|---|---|---|---|---|---|
| | | | | | | Coil center portion (S1) | Vicinity of conductor layers (S2) | | | | Bending amount 1.2 mm | Bending amount 1.6 mm | Bending amount 2.0 mm |
| Example 1 | <1 | <2 | Sr | 30 | 20 | 6.9 | 20.8 | 3.0 | 13 | 5.55 | 0/10 | 0/10 | 2/10 |
| Example 2 | <1 | <2 | Sr | 0 | 60 | 16.0 | 20.0 | 1.3 | 4 | 5.70 | 0/10 | 0/10 | 2/10 |
| Comparative Example 1 | <1 | <2 | Sr | 0 | 20 | 6.5 | 6.5 | 1.0 | <3 | 5.40 | 2/10 | 6/10 | 10/10 |
| Example 1 | <1 | <2 | Sr | 30 | 20 | 6.9 | 20.8 | 3.0 | 13 | 5.55 | 0/10 | 0/10 | 2/10 |
| Example 4 | <1 | 20 | Sr | 30 | 20 | 16.0 | 29.6 | 1.9 | 10 | 5.65 | 0/10 | 0/10 | 0/10 |
| Example 5 | <1 | 50 | Sr | 30 | 20 | 20.5 | 30.5 | 1.5 | 10 | 5.60 | 0/10 | 0/10 | 0/10 |
| Example 1 | <1 | <2 | Sr | 30 | 20 | 6.9 | 20.8 | 3.0 | 13 | 5.55 | 0/10 | 0/10 | 2/10 |
| Example 6 | <1 | <2 | Mg | 30 | 20 | 6.5 | 16.3 | 2.5 | 7 | 5.30 | 0/10 | 1/10 | 5/10 |
| Example 7 | <1 | <2 | Ca | 30 | 20 | 7.0 | 18.9 | 2.7 | 12 | 5.50 | 0/10 | 0/10 | 4/10 |
| Example 8 | <1 | <2 | Ba | 30 | 20 | 8.0 | 24.0 | 3.0 | 9 | 6.00 | 0/10 | 0/10 | 2/10 |
| Example 1 | <1 | <2 | Sr | 30 | 20 | 6.9 | 20.8 | 3.0 | 13 | 5.55 | 0/10 | 0/10 | 2/10 |
| Comparative Example 2 | ≥1 | <2 | Sr | 0 | 20 | 5.0 | 4.5 | 0.9 | <3 | 5.30 | 3/10 | 10/10 | 10/10 |
| Comparative Example 3 | ≥1 | <2 | Sr | 30 | 20 | 5.5 | 4.1 | 0.8 | <3 | 5.35 | 5/10 | 10/10 | 10/10 |

According to Table 1, each Example having a value larger than 1.0 as the value calculated by dividing the area ratio of the feldspar crystal phases in the vicinity of the conductor layers by the area ratio of the feldspar crystal phases away from the conductor layers had low relative permittivity $\varepsilon$ and high bending strength. In contrast, each Comparative Example having a value of 1.0 or less as the value calculated by dividing the area ratio of the feldspar crystal phases in the vicinity of the conductor layers by the area ratio of the feldspar crystal phases away from the conductor layers had lower bending strength.

In Examples 6 to 8, in which the metal element mainly included in the glass raw material of Example 1 was changed from Sr to Mg, Ca, or Ba, the metal element mainly included in the feldspar crystal phases changed from Sr to Mg, Ca, or Ba.

Examples 6 to 8, in which the metal element was changed to Mg, Ca, or Ba, had good characteristics. Examples 6 and 7, in which the metal element was changed to Mg and Ca respectively, had lower strength than Example 1. Example 8, in which the metal element was changed to Ba, had higher relative permittivity a than Example 1.

Examples 4 and 5, in which the $Al_2O_3$ fillers had an average aspect ratio of 15 or more and 75 or less, had better bending strength than Example 1, in which all conditions were the same as in Examples 4 and 5 except that the $Al_2O_3$ fillers had an average aspect ratio of less than 15.

NUMERICAL REFERENCES

1 . . . multilayer coil component
2 . . . glass ceramic element body
2a, 2b . . . end surface
2c to 2f . . . side surface
3 . . . mounting conductor
5 . . . coil conductor
6, 7 . . . connecting conductor
10 . . . coil
21, 22 . . . depression
31, 32 . . . conductor portion
12a to 12h . . . glass ceramic element body layer
13 . . . mounting conductor layer
15c to 15f . . . coil conductor layer
16, 17 . . . connecting conductor layer
La to Lh . . . layer
Rb to Rg . . . recess
51 . . . area away from conductor layers
53 . . . area in the vicinity of conductor layers
111 . . . $SiO_2$ phase
112 . . . non-crystalline glass phase
113 . . . feldspar crystal phase
114 . . . $Al_2O_3$ phase

What is claimed is:

1. An electronic component comprising:
a glass ceramic layer; and
a conductor layer, wherein
the glass ceramic layer includes feldspar crystal phases, non-crystalline glass phases, and $Al_2O_3$ fillers of $Al_2O_3$ phases; and
an area ratio of the feldspar crystal phases in a vicinity of the conductor layer is larger than an area ratio of the feldspar crystal phases away from the conductor layer.

2. The electronic component according to claim 1, wherein
the conductor layer mainly comprises Ag.

3. The electronic component according to claim 1, wherein
the $Al_2O_3$ fillers of the $Al_2O_3$ phases have an average aspect ratio of 15 or more and 75 or less.

4. The electronic component according to claim 1, wherein
the feldspar crystal phases mainly comprise Sr.

5. The electronic component according to claim 1, wherein
the feldspar crystal phases comprise Ag.

6. The electronic component according to claim 1, wherein
the glass ceramic layer optionally includes $SiO_2$ phases and
the phases other than the feldspar crystal phases, the non-crystalline glass phases, the $Al_2O_3$ phases, and the $SiO_2$ phases occupy an area ratio of 5% or less, including 0%.

7. The electronic component according to claim 1, wherein
at least one pair of the $Al_2O_3$ phases is bonded via at least one of the feldspar crystal phases.

\* \* \* \* \*